Sept. 28, 1943.  W. H. SAGSTETTER  2,330,748
BRAKE BEAM STRUT
Filed Sept. 30, 1940  2 Sheets-Sheet 2
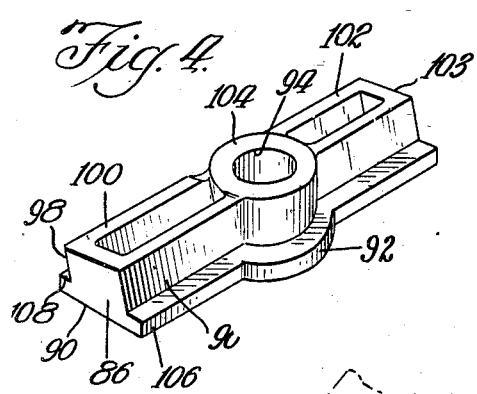
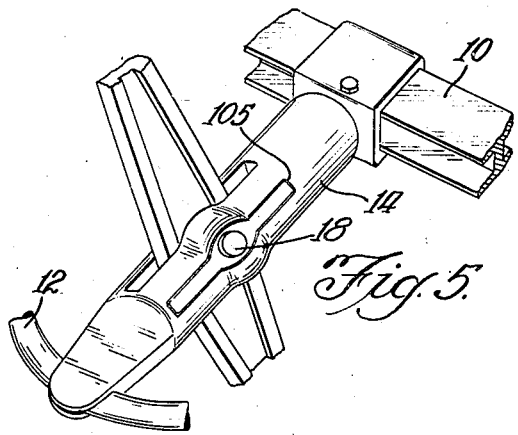
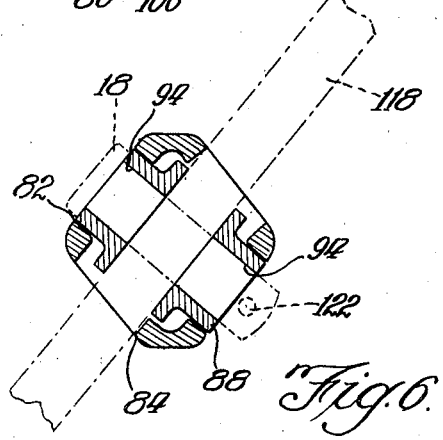
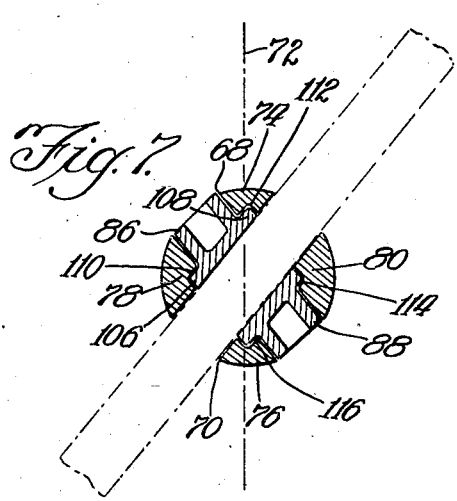
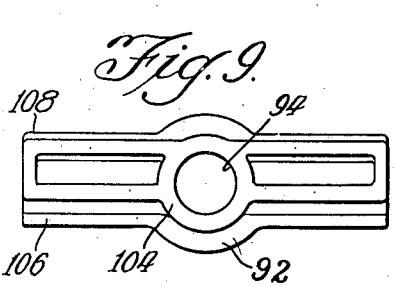
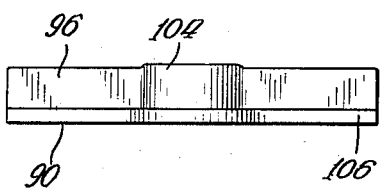
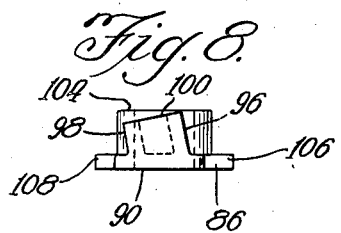
Inventor:
William H. Sagstetter.

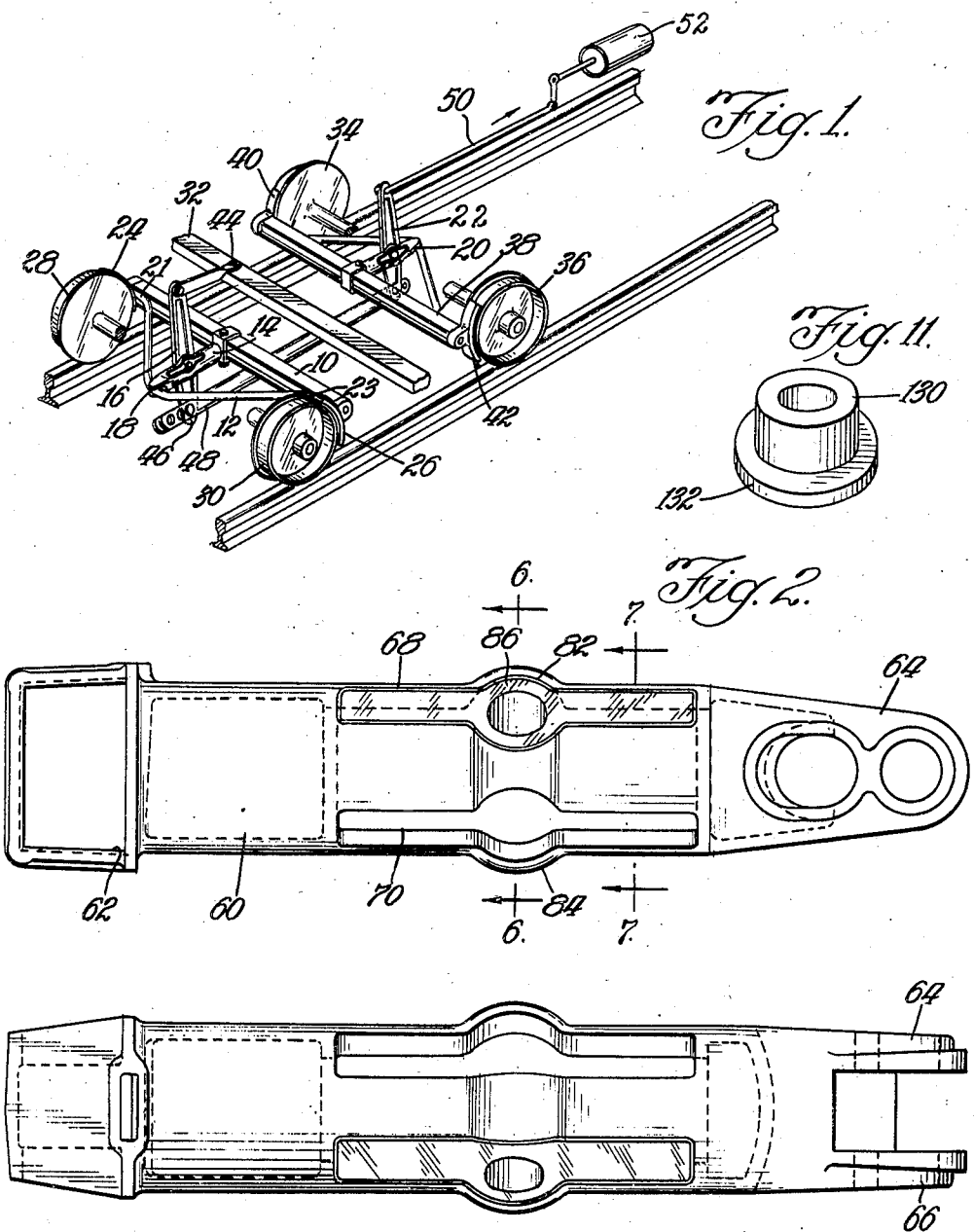

Patented Sept. 28, 1943

2,330,748

UNITED STATES PATENT OFFICE 2,330,748

BRAKE BEAM STRUT

William H. Sagstetter, Denver, Colo.

Application September 30, 1940, Serial No. 358,950

4 Claims. (Cl. 188—232)

This invention relates to a new and improved brake beam strut. More particularly, this invention relates to a brake beam strut of the rigid type which meets the structural and tensile strength requirements of various railroads and associations and yet is capable of use as either a right-handed or a left-handed brake beam strut.

Referring to Figure 1 of the drawings for a moment, the term "brake beam" identifies an assemblage consisting of a compression member 10, a tension member 12 and a strut 14. On each end of the compression member is mounted a brake shoe and horizontal movement of the brake beam is derived from a lever 16 which is pivoted on the strut. The angle of the lever 16 with the vertical is 40° and the pin 18 which holds the lever 16 to the strut is at an angle of 90° to the lever. These angles are universal in the United States. Referring now to Figure 1, it will be noted that there are two brake beams to each car truck of four wheels and that the brake beams are directed away from each other in applying the shoes to the wheels. It, therefore, follows that the brake beam strut identified by the numeral 20 for the other pair of wheels holds the lever 22 at the same but opposite angle with respect to the vertical. The brake beam struts 14 and 20 therefore differ from each other in that the lever openings are 80° apart and the pin openings 100° apart. These brake beam struts are generally identified as left- and right-handed brake beam struts, 14 being a left-handed strut and 20 being a right-handed strut.

It now being clear that the brake beam struts are of two types, it will be appreciated that there has long been pressure toward establishing what might be defined as a universal brake beam strut. Under present practice it is not only necessary to maintain both right- and left-handed brake beam struts at a large number of repair points on railroads but practice quite generally is to stock left and right brake beams complete, that is to say, beams having the compression and tension members joined by left- and right-handed brake beam struts. It is evident that if a universal brake beam strut could be devised, the brake beam inventory could be halved.

While it has been proposed heretofore to provide a rigid brake beam strut having two oppositely disposed slots so that the strut may be used in connection with either a left-hand or a right-hand brake beam, commercial success has not been obtained by such struts. The first object of this invention is to provide such a strut wherein the slot in the strut itself will have a width slightly exceeding that of the brake beam lever to be inserted therethrough and to provide in connection with the other slot means for holding a supporting brake beam pin at right angles to the slot through which the brake beam is to pass. The means provided are so positioned that they do not interfere with the slot through which the brake beam lever is to pass. By this arrangement the pin holding means perform primarily a pin holding function. They are not subject to lateral forces from the brake beam lever itself other than those derived through the pin. The brake beam lever is held against lateral displacement primarily by the strut itself, an arrangement which eliminates wear factors in the pin whereby my improved strut is considered commercially safe.

A second object of this invention is to provide new and improved pin wearing plates and in conjunction therewith, new and improved means for holding the pin wearing plates in assembled relationship with the strut. A brake beam lever pin is comparatively large, approximating in diameter the thickness of a brake beam lever, see Figure 6 of the drawings. In order to provide a mounting in a pin wearing plate having the requisite strength, it is desirable to enlarge the pin wearing plate at its central portion. As a result of this it is further necessary to provide enlarged openings centrally of the strut in order to receive the plate. One of the features of this invention is the provision of interior channels at the points of intersection of the slots in the strut which provide the principal wear points between the pin wearing plates and the strut, while nevertheless providing means to receive the enlarged central portion of each pin wearing plate.

Another object of my invention is to overcome the problem inherent in conforming a plate insert surface to a slot having a 40° angle with the vertical and of providing a pin wearing plate having a hole disposed at an angle of 90° with the inclination of the slot. One of the features of the invention is the provision of pin wearing plates having a flat surface for alignment with the wall of the slot through which the lever is to pass and other surfaces at an angle of 80° to said flat surface for holding the insert in the adjacent slot and at the same time providing a means for positioning a hole for holding the pin at an angle of 90° with the first named surface. The problem herein encountered will be more fully examined into in the disclosure which follows.

A brake beam possessing the features enumerated above provides many advantages. In the first place, it eliminates the necessity of stocking both left- and right-handed brake beams, a substantial saving in railroad inventory. Additionally, the pin holes in existing brake beam struts can only be repaired when they have worn too large by removing the strut from the brake beam, a laborious operation, by reaming out the hole, filling it in and then bushing it. In my structure the holes supporting the pin are not in the brake beam itself but in metal inserts which can be removed from the brake beam without disconnecting the strut from either the tension or the compression members. Moreover, it may be less expensive to replace such inserts which have become worn by new inserts than it is to repair them. A further advantage of this structure is that it meets railroad and railroad association strut requirements. A strut must possess given tensile and structural strength and I can vary the size of the walls through which the lever slots are cut to meet any commercial brake beam requirements. Another advantage of my structure is its interchangeability with present brake beams. It is unnecessary to provide any additional elements in building up a brake beam with this brake beam strut in place of the conventional existing strut, although such elements have been required for replacing conventional struts with, for example, swivel struts.

These and such other objects as may hereinafter appear are attained in one embodiment of the invention shown in the drawings, wherein:

Figure 1 is a perspective view, partly diagrammatic of a railroad truck brake assembly;

Figure 2 is a plan view of my improved brake beam strut;

Figure 3 is a view in side elevation thereof;

Figure 4 is a perspective view of a reversible pin wearing plate or insert;

Figure 5 is a perspective of one brake beam including my brake beam strut;

Figure 6 is a view in section taken on the line 6—6 of Figure 2;

Figure 7 is a view in section taken on the line 7—7 of Figure 2;

Figure 8 is a side elevation of the pin wearing plate;

Figure 9 is a plan view of said plate;

Figure 10 is a side view in elevation of the same; and

Figure 11 is a perspective of a washer type of pin wearing plate.

Continuing to refer to the drawings and particularly to Figure 1, the numeral 10 identifies a brake beam compression member, 12 a tension member and 14 a brake beam strut. The tension member 12 is fastened to the compression member at points 21 and 23 and at either end of the compression member are brake shoes 24 and 26 disposed to engage wheels 28 and 30 respectively. The cross bar 32 is a portion of the truck frame and as such bears a substantially fixed horizontal relationship to the wheels.

The other two wheels 34 and 36 of the truck are braked from the inner side of the truck by means of a brake beam generally identified by the numeral 38 having on each end brake shoes 40 and 42. The first brake beam having the brake beam strut 14 is actuated by a lever 16 which is pivotally fastened to the member 32 at 44 and at its opposite end 46 to a link 48. The link 48 in turn is pivotally fastened to the lever 22 which operates the brake beam 20. The lever 22 is connected to a rod 50 which is reciprocated by suitable means as from an air compressor 52. On movement of the rod 50 in the direction of the arrow, the brake beam 38 is drawn toward the wheels 34 and 36 while the other brake beam is advanced toward the wheels 28 and 30, and inasmuch as this brake assembly is fastened to the truck only at one point, namely 44, the two brake beams will apply pressure equally to their respective sets of wheels.

The lever arms 16 and 22 are inclined from the vertical in order that the link 48 may not pass through a vertical line through the center of the truck, which point is normally occupied by other parts of the truck equipment. The angle of inclination in United States equipment is 40°. The angle of the pin as 18, see Figure 5, with respect to the lever is normal, that is 90°. The two levers 16 and 22 are on the same side of the vertical and inasmuch as the brake beam struts are directed in the opposite direction, the slots for the levers must be oppositely inclined. The brake beam strut 14 is a left-hand strut while the brake beam strut 20 is a right-hand strut.

It will be understood that the problem is to provide a brake beam strut that will receive a lever at either angle of 40° with respect to the vertical. The conventional compression member holder is shown in Figure 5 and consists of an opening in a steel casting through which the compression member is passed. There is, however, no holder which may be rotated through 80° and still obtain a proper purchase upon the compression member. A gripping means capable of holding the compression member in only one position is universally provided on brake beam struts.

Examining now my improved brake beam strut, and referring to Figure 2, the strut comprises a member 60 which may be tubular or solid having a channel 62 in a specially formed end through which channel a compression member, such as 10 in Figure 1, may be passed. The tubular member 60 has at its other end a pair of ears 64 and 66 for holding the tension member, such as 12. The two ends of the brake beam strut are conventional in order to facilitate their replacing existing struts without necessitating new compression or tension members. There are many other means for holding tension members or compression members.

In the main portion of the strut is cut two intersecting elongated slots 68 and 70. Referring to Figure 7, the slot 68 is inclined at an angle of 40° with the vertical line 72 and the slot 70 is similarly but oppositely inclined. The two slots 68 and 70 are defined along the sides by the upper and lower wall portions 74 and 76 respectively and the two side wall portions 78 and 80, and it will be observed that the side wall portions 78 and 80 cover a greater angularity with respect to the axis of the strut than do the upper and lower walls 74 and 76. Centrally of each slot is cut an enlarged circular opening as 82 and 84, see Figure 2. These two openings pass completely through the strut and their extent may be seen in Figure 6.

At this point it will thus be seen that a strut is provided having therethrough two intersecting slots 68 and 70 which are inclined to the vertical on opposite sides thereof at an angle of 40°, These slots, therefore, provide the means of passing a brake beam actuating lever through the strut at either angle and there remains the problem of providing a means for pivoting the lever to the strut so that an operable relationship therebetween may be established.

The means for pivoting the lever on the strut comprise a pair of reversible pin wearing plates or inserts identified by the numerals 86 and 88 in various figures of the drawings. Referring to Figures 4, 8, 9 and 10, the pin wearing plate 86 has a base surface identified by the numeral 90 lying in a plane. Centrally of this plate is an enlarged portion 92 in which is disposed a hole 94 having an axis at right angles to the plane surface 90. The length of the plate 86 is slightly less than the length of a slot 68, see Figure 2. Guiding surfaces, such as 96 and 98, see Figure 8, are disposed at an angle of 80° with respect to the plane surface 90. The surfaces 100 and 102 are in a plane at an angle to the surface 90 of 10°. The surface 104 is in a plane parallel to the plane surface 90. Along the two long sides of the pin wearing plate are shoulders 106 and 108 of a size to sit in the channels 110, 112, 114, and 116, referring to Figure 7.

All over-all dimensions of the insert are correspondingly less than the over-all dimensions of any one of the slots so that it is possible to introduce an insert into one slot and then seat it, by means of the shoulders 106 and 108, in complementary channels such as 110 and 112, see Figure 7, of an adjacent portion of a slot. It will be observed that after an insert has been properly seated in one slot a portion of it will be in alignment with the walls of the other or intersecting slot. For example, in Fig. 7 the inserts are shown seated in slot 68 so that the faces 90 thereof are in alignment with the respective walls of the slot 70. Referring to Figure 6, it will be noted that the enlarged circular portion 82 of a slot receives the pin wearing plate 86 fairly snugly, but between this portion of the walls 78 and 76 and the pin wearing plate 86 there is no supporting relationship. Referring to Figure 7, it will be noted that the inclination of the surface 100 effects a fairly smooth joint between that surface and the wall members 74 and 78 which serves to maintain the generally cylindrical shape of the strut.

In assembling my strut with a lever arm such as 16, referring to Figure 6, assuming that a left-hand brake beam is wanted, the lever would then be passed through the strut to occupy the position indicated by the dotted line 118. Before the lever is passed through the strut, however, a pair of pin wearing plates are successively introduced through the slot which the lever 16 will occupy and seated in the channels so as to block the other slot 68. When the two pin wearing plates are in position the lever 16 is passed through the slot 70 and a pin 18 is then passed through the holes 94 of the two pin wearing plates 86 and 88 and a hole 120 in the lever 16 and is locked in assembled relationship by any means such as the cotter pin 122. By this construction it will be evident that the lever 16 will be held against lateral displacement primarily by the strut. The plates or inserts hold the pin 18 and are subject to lateral forces from the brake beam lever only through the pin 18, thereby eliminating wear factors in the pin. In order to provide a right-hand brake beam, all that is necessary is to position the pin wearing plates in the slot 70 and pass the lever 16 through the slot 82, similarly positioning the pin.

It will be noted that the pin wearing plates are held in assembled relationship by means of the lever arm 16 and the walls of the strut which forms a slot. It is not believed that this particular structure is in any way crucial. A variety of other means could be provided.

Importance is not attached to the channels 110 and the like or to the angularity of the walls 96 and 98 with respect to the plane surface 90 other than that these channels and the sloping of the surfaces provide one means of securing firm relative position between the pin wearing plates and the slots of the strut. Also, the employment of a plane surface 90 for engagement with the lever arm 16 is primarily a means of assisting the general positioning of the pin wearing plates in conjunction with conventional lever arms. The development of lever arms having other than flat side surfaces might warrant the substitution of other than a plane surface for the surface 90 in the pin wearing plates.

As for the provision of pin plates having an axis at right angles to the lever 16, this is believed unquestionably desirable in order to avert undue wear on both pin and hole. It will be noted that the walls 96 and 98 are at an angle of 80° to the surface 90, which angle is equal to the angle between the two slots 70 and 68. This angle is critical only insofar as railroad and railroad association specifications call for this specific angle. It will also be observed that so long as the angle between the slots with respect to the vertical is elongated, it is possible to utilize one pin wearing plate in either position by simply reversing the plate. Hence the plate may be described properly as a reversible pin wearing plate.

It should not be inferred that because the slots are elongated and that the pin wearing plates heretofore described are elongated that the plates must have such a shape. In Figure 11, there is shown a washer type plate 130 which is circular and has a shoulder 132. When such a pin wearing plate is employed, a strut having an enlarged portion at the central point where the pin wearing plates are to be disposed is employed. It is not important that the pin wearing plate be held against rotational movement nad hence it follows that the pin wearing plate of the type shown in Figure 11 will function as satisfactory as the type of pin wearing plate heretofore described as the preferred form.

Attention is called to the advantage of the reversibility of the pin wearing plates. Referring to the elongated type shown in Figure 4, the wear on such a plate occurs not only at the pin hole 94 but also on whichever end wall 103 engages the inner end of a slot as 105 in Figure 5. Referring to Figure 1, it will be observed that the braking assembly is such that the pressure on the pin wearing plate against the strut is always on that side of the strut adjacent to the compression member. It follows, therefore, that a pin wearing plate wears at only one end. By being reversible, in the full sense, whereby the pin wearing plate is turned lengthwise through 180° as well as sidewise through 180° in order to fit into the opposite slots, it is possible to wear a pin wearing plate at both ends. This clearly increases the useful life of the plate.

It will thus be seen that there has been provided a strut of the rigid type having walls 74, 76, 78 and 80 integral with the two end holding members for the compression and tension members whereby all movable or frictional parts are eliminated so that structural and tension strength requirements of railroads and railroad associations may be maintained. Additionally, there has been provided a means of mounting a brake beam actuating lever at either of two angles with respect to the vertical, the two angles being the only angles approved by railroads and associations for brake beam struts. By this construction it will be possible to cut in half the brake beam inventory of railroads while nevertheless advancing the same repair surface as in the past. Additionally, my structure substitutes comparatively inexpensive wearing plates for carrying the hole which sustains the wear in place of the strut itself. Several advantages derive from the use of these wearing plates. If it is profitable to ream and rebush these holes when they have become too large, they are more easily removed from the brake beam assembly than is a brake beam strut. On the other hand, if the hole is worn to a place where it cannot be rebuilt and rebushed, the discarding of a pin wearing plate is far less expensive than the discarding of a brake beam strut. Additionally, this strut is of a type which may be assembled with existing compression and tension members which form two of the three major parts of a brake beam. In this connection the means for holding the brake beam strut to either the compression or the tension member as shown in Figures 2 and 3 are to be understood as conventional. There are other types which could be substituted therefor.

Having thus described my invention, what I claim as new and desire to secure by Letters Patent of the United States is:

1. A brake beam strut of the rigid type comprising an elongated member, a pair of slots extending longitudinally of said elongated member and intersecting each other at an angle of approximately 80° whereby to define in the elongated member two intersecting pairs of substantially parallel wall portions, an enlarged socket in each of said slots, and means mounted in one slot and the sockets therein having a portion thereof in alignment with the walls of the second slot for holding a brake beam lever pin at an angle of 90° to the second slot, whereby a brake beam lever positioned in the latter slot will be held against lateral displacement.

2. A brake beam strut of the rigid type comprising an elongated member, a pair of slots extending longitudinally of said elongated member and intersecting each other at an angle of approximately 80° whereby to define in the elongated member two intersecting pairs of substantially parallel wall portions, an enlarged socket in each slot approximately midway the length of each, and means disposed in the two sockets of one of said slots so as to form substantially continuous walls in the second slot for holding a brake beam lever pin at an angle of 90° with respect to the second slot.

3. A brake beam strut of the rigid type comprising an elongated member, a pair of slots extending longitudinally of said elongated member and intersecting each other at an angle of approximately 80° whereby to define in the elongated member two intersecting pairs of substantially parallel wall portions, an enlarged socket in each slot approximately midway the length of each, a pair of elongated pin wearing plates having an enlarged central portion for seating in said sockets and being oppositely positioned to close one slot so as to form a continuous wall for the other slot, and means in said pin wearing plates for seating a brake beam pin in one slot at substantially right angles to the other slot whereby a brake beam will be held against lateral rocking by the walls of the slot in the elongated member.

4. A brake beam strut of the rigid type comprising an elongated member, a pair of slots extending longitudinally of said elongated member and intersecting each other at an angle of approximately 80° whereby to define in the elongated member two intersecting pairs of substantially parallel wall portions, channels in the elongated member at the intersection points of said slots, a socket in each slot at approximately its midpoint, a pair of elongated pin wearing plates having an enlarged central portion with a lever pin hole therethrough seated in said identical channels so as to close one slot and to form a continuous wall for the second slot, and aligned holes in said pin wearing plates at right angles to the second slot.

WILLIAM H. SAGSTETTER.